United States Patent [19]

Nistri et al.

[11] 3,929,696

[45] Dec. 30, 1975

[54] CONTINUOUS PROCESS FOR THE PRODUCTION OF AMINOPLAST MOULDING COMPOSITIONS

[75] Inventors: Ugo Nistri, Como; Antonio Parodi; Silvio Vargiu, both of Milan, all of Italy

[73] Assignee: Societa' Italiana Resine S.I.R. S.p.A., Milan, Italy

[22] Filed: June 17, 1974

[21] Appl. No.: 480,445

[30] Foreign Application Priority Data

June 15, 1973   Italy................................. 25411/73

[52] U.S. Cl. ................ 260/17.3; 264/123; 428/528
[51] Int. Cl.² ............................................ C08L 1/02
[58] Field of Search .................... 117/143 A, 161 L; 260/17.3; 428/528

[56] References Cited

UNITED STATES PATENTS

| | | | |
|---|---|---|---|
| 2,679,490 | 5/1954 | Meiser et al. ...................... | 260/17.3 |
| 3,026,277 | 3/1962 | Gerko................................ | 260/17.3 |
| 3,376,239 | 4/1968 | Pfeiffer............................. | 260/17.3 |

FOREIGN PATENTS OR APPLICATIONS

| | | | |
|---|---|---|---|
| 108,518 | 12/1958 | Pakistan............................ | 260/17.3 |

*Primary Examiner*—Donald E. Czaja
*Assistant Examiner*—Edward Woodberry
*Attorney, Agent, or Firm*—Sughrue, Rothwell, Mion, Zinn & Macpeak

[57] ABSTRACT

Process for the production of aminoplast moulding compositions, which comprises impregnating cellulose material with a syrup of an aminoplast resin, values of about 4:1 to about 50:1 being maintained for the weight ratio between the said syrup and the cellulose material, eliminating the excess of resin to obtain a quantity of cellulose material of from about 15 to about 50 parts by weight per 100 parts by weight of resin in the impregnated material, homogenizing the impregnated material with the appropriate additives and subjecting the resulting mixture to drying and granulation.

6 Claims, 1 Drawing Figure

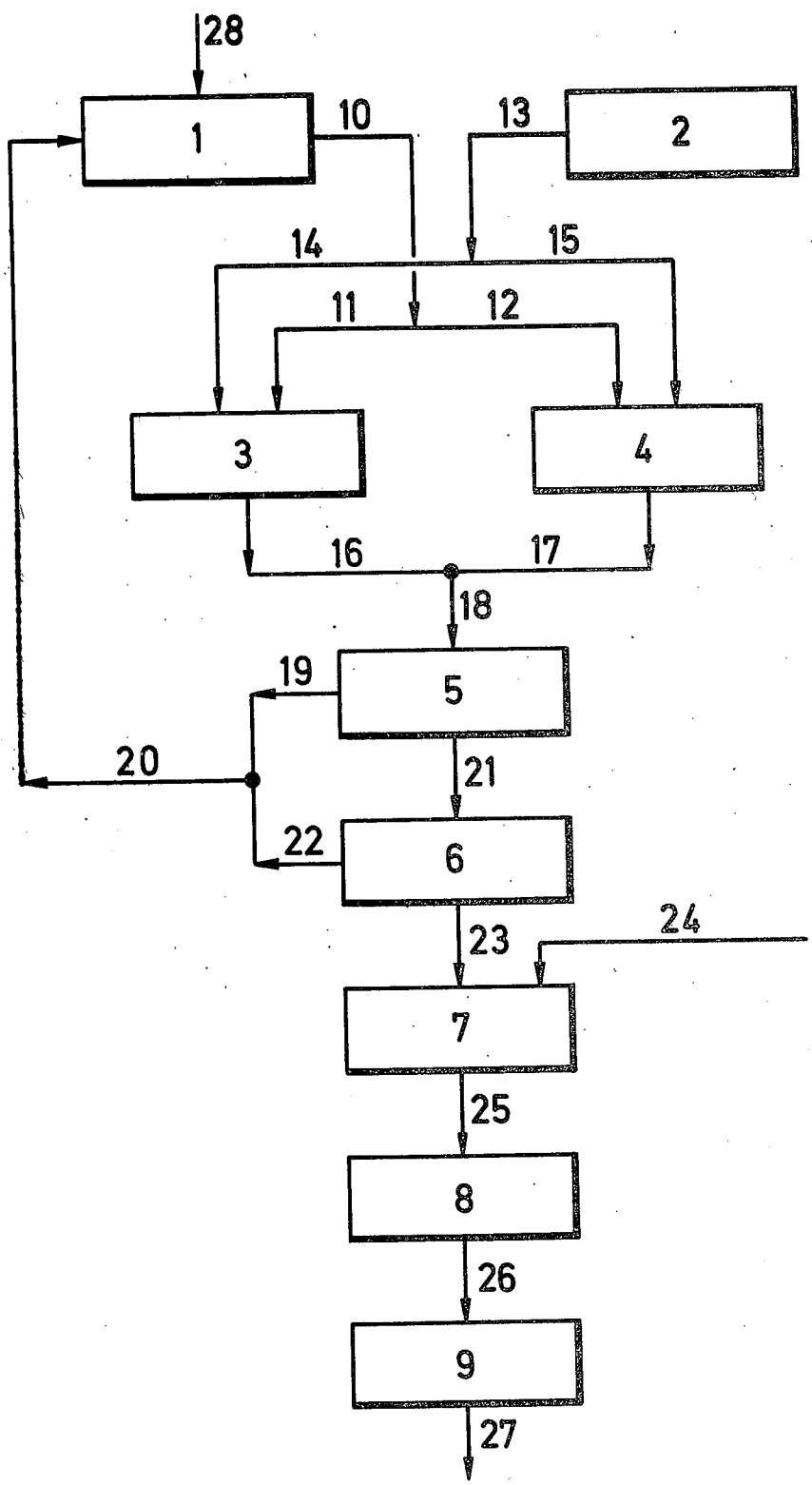

CONTINUOUS PROCESS FOR THE PRODUCTION OF AMINOPLAST MOULDING COMPOSITIONS

BACKGROUND OF THE INVENTION

1. Field of the Invention

The present invention relates to a process for the production of aminoplast moulding compositions comprising cellulose fillers.

2. Description of the Prior Art

The inert cellulose filler normally used in combination with the aminoplast resin in aminoplast moulding compositions is purified cellulose pulp. Furthermore, these compositions contain accelerators or curing catalysts consisting of substances that have an acidic nature at the moulding temperature, the function of the accelerators being to make the curing process faster. Lubricants, which prevent adhesion between the moulded article and the surface of the mould which are normally chosen from among the metal stearates, are also added to the aminoplast compositions. Since the aminoplast moulding powders contain an acidic accelerator which can cause further polymerization of the resin (e.g. as a result of long storage periods), a small quantity of substance that is capable of neutralizing the effects of the acidity without adversely influencing the curing of the resin at high temperatures is added. The substance most commonly used for this purpose is hexamethylenetetramine.

In the preparation of the moulding compositions the aminoplast resin, in the form of an aqueous syrup, is mixed with the inert filler and is then dried under controlled conditions of temperature and humidity. The dried material is then mixed with the other ingredients and reduced to a fine powder, e.g. by grinding in a ball mill. The powder may subsequently be compacted and granulated.

The production of the moulded articles is finally carried out at high temperatures and pressures.

SUMMARY

It is therefore an object of the present invention to provide moulding compositions containing an aminoplast resin having improved physico-chemical properties.

It is another object of the present invention to provide compositions containing an aminoplast resin that yield articles having improved mechanical properties on moulding.

It is a further object of the present invention to prepare the compositions by a continuous process.

Other objects of the invention will be apparent from the following description and claims.

The process of the present invention consists essentially in impregnating the inert cellulose filler with the aminoplast resin in a large excess and subjecting the residual product, after separation of the excess of resin, to homogenization with the other ingredients and to drying.

By operating in this way complete impregnation of the inert filler with the resin is achieved. Consequently, moulding compositions having improved physico-chemical properties is obtained. Moreover, such compositions are suitable for the production of moulded articles having high mechanical properties. Finally, since the process is carried out continuously, the advantages associated with the production of compositions whose characteristics are constant with time is obtained, as well as those advantages normally associated with the achievement of automation of the process itself.

The invention provides a process for the preparation of aminoplast moulding compositions which comprises impregnating cellulose material with a syrup of an aminoplast resin, values of about 4:1 to about 50:1 being maintained for the weight ratio between the syrup and the cellulose material, eliminating the excess of resin to obtain a quantity of cellulose material of from about 15 to about 50 parts by weight per 100 parts by weight of resin in the impregnated material, homogenizing the impregnated material with the appropriate additives and subjecting the resulting mixture to drying and granulation.

The resins that can be used for the compositions of the present invention are those obtained by condensation of formaldehyde and possibly also phenol with urea, thiourea, melamine, and dicyanodiamide. Among these, the preferred resins are those obtained by condensation of formaldehyde with urea in molar ratios of from about 1.1 : 1 to about 1.7 : 1, which, as is known, are obtained in the art in the form of aqueous syrups having solids contents of from about 50 to about 80% by weight.

As the inert cellulose filler, the compositions of the present invention preferably contain purified cellulose pulp. The filler is present in the composition in quantities of from about 15 to about 50 parts by weight, and preferably from about 25 to about 40 per 100 parts by weight, of the aminoplast resin.

The substances having an acidic nature that can be used as accelerators or curing catalysts can be of various kinds, such as: zinc sulphite, benzoic acid, phtalic anhydride, chlorinated compounds such as chloroacetamides and tetrachlorophthalic anhydride, amine salts such as triethanolamine hydrochloride, and salts of peracids such as guanidine persulphate.

Preferably, the compositions of the present invention contain the acidic substances in quantities of from about 0.05 to about 2.5% by weight.

The lubricating substances used to prevent adhesion between the moulded article and the surface of the mould, such as zinc, magnesium, and aluminum stearates, are present in the compositions in quantities preferably of from about 0.5 to about 2.5% by weight.

The compositions of the present invention also contain hexamethylenetetramine in quantities of about 1 to 4% by weight, for the purpose of neutralizing the effects of the acidic component on the plasticity characteristics of the resin.

In addition to pigments, the compositions may also contain a plasticizer whose purpose is to improve the plasticity or flow characteristics of the resin during moulding.

During the impregnation phase the weight ratio between the aminoplast resin syrup and the cellulose material preferably amounts to about 20 : 1 about to about 30 : 1. The syrups preferred for the purpose have solids contents of from about 60 to about 75% by weight. During the impregnation, the mass is continuously stirred and the operation is carried out at temperatures of from about 25° to about 70°C and for times of from about 1 to about 24 hours. The types of equipment suitable for the purpose are tubular or cylindrical reactors fitted with stirrers.

By operation in the manner described perfect impregnation of the cellulose material is achieved, and obtained is a product in the form of a slurry that is easily transferrable, e.g. by means of a pump.

With reference to the attached FIG. 1, items 3 and 4 represent the containers (disintegrators or pulping apparatuses) in which the impregnation of the cellulose filler with the aminoplast resin is carried out. More particularly, the two containers act alternately as disintegrators and as containers for the feeding of the slurry to the subsequent treatments. Thus the aminoplast resin is fed in the form of a syrup from the storage tank 1 through the pipes 10 and 11 to the disintegrator 3. The cellulose material is fed from the tank 2 through the pipes 13 and 14.

The impregnation of the cellulose material is carried out in the disintegrator 3 under the conditions described earlier. At the same time, the slurry prepared earlier is fed from the container 4 through the pipes 17 and 18 to the apparatus 5 for the separation of the excess resin. In practice, the process is carried out in two stages, a first fraction of the excess resin being separated in 5 by means of a battery of "thickening screws" or by means of a continuous centrifuge. The resin is then fed through pipe 21 into the filter press 6, where the resin/filler ratio is then brought to the desired values. The excess resin recovered through the pipes 19 and 22 is returned to the storage tank 1 through the pipe 20. The fresh aminoplast resin is fed to the same tank through the pipe 28.

In the phase in which 4 is the disintegrator and 3 is the container, the aminoplast resin is fed through the pipes 10 and 12 and the cellulose is fed through the pipes 13 and 15. In this case the pulp is fed from the container 3 through the pipes 16 and 18 into the separator 5.

The impregnated product obtained in this way is evacuated through the pipe 23 and homogenized with the additives fed through the pipe 24. More particularly, the additives added are hexamine, the catalysts, the accelerators, the lubricants, the plasticizers, and the pigments. With reference to the attached figure, the homogenization is carried out by the grinder 7, and then after passing the pipe 25, the mixer 8. The mixture homogenized in this way is fed to the drier 9 through the pipe 26. Drying is carried out by blowing warm air into equipment of various types, e.g. turbotray driers. This phase of the process is normally carried out at temperatures of from about 80° to about 120°C, the humidity of the air being maintained at values of from about 5 to about 20%. The residence times in the drier can vary within a range of values from about 15 to about 180 minutes, and in every case the process is continued until the product has a residual moisture content of about 1.5% by weight.

The product dried in this way is evacuated through the pipe 27 and subjected to the usual grinding and pigmentation treatments. The powder obtained may be subjected to moulding as such, or it may be converted into granules by sintering or compaction in order to obtain products having the granulometry required for the various conversion techniques.

The invention is further illustrated by the following non-limiting examples.

EXAMPLE 1 (Preparation of the resin)

A urea-formaldehyde resin is prepared by introduction of a urea-formaldehyde precondensate (1800 parts by weight), water (660 parts by weight), and urea (1100 parts by weight) into an autoclave. In particular, the syrup or urea precondensate contains 59% by weight of formaldehyde and 24.5% by weight of urea, and has a density of 1.320 at 25°C and a viscosity of 53 seconds in a no. 4 Ford cup at 25°C. The content of formaldehyde in the free form is 21%, that in the methylol form is 36.5%, and that in the methylene form is 1.5%. The mass in the reactor is stirred and heated to a temperature of 60°C. These conditions are maintained for about 15 minutes, and the mass is then cooled to 20° to 25°C. A product having the following characteristics is obtained in this way:

| | |
|---|---|
| Solids content (% by weight) | 72.5 |
| Density at 25°C (g/ml) | 1.258 |
| Viscosity in no. 2 Ford cup at 25°C (sec) | 82 |
| pH | 7.7 |

EXAMPLE 2 (Preparation of the resin)

The procedure of Example 1 is followed, the autoclave being charged with 900 parts by weight of water, together with the urea precondensate syrup (1800 parts by weight) and the urea (1100 parts by weight). Operation as described in the first example gives a product having the following characteristics:

| | |
|---|---|
| Solids content (% by weight) | 68 |
| Density at 25°C (g/ml) | 1.243 |
| Viscosity in no. 2 Ford cup at 25°C (sec) | 76 |
| pH | 7.6 |

EXAMPLE 3 (Preparation of the resin)

The procedure of Example 1 is followed, the autoclave being charged with 1200 parts by weight of water, together with the urea precondensate syrup (1800 parts by weight) and the urea (1100 parts by weight). Operation as described in the first example gives a product having the following characteristics:

| | |
|---|---|
| Solids content (% by weight) | 63 |
| Density at 25°C (g/ml) | 1.225 |
| Viscosity in no. 2 Ford cup at 25°C (sec) | 67 |
| pH | 7.6 |

EXAMPLE 4 (Comparison)

1780 parts by weight of the resin obtained in Example 1 and 490 parts by weight of cellulose are charged into a Werner-type mixer (double arm mixer). The cellulose is impregnated for 15 minutes and the following additives are then added: hexamine (26 parts by weight), stearin (21 parts by weight), and zinc sulphite (21 parts by weight). The mass is heated in such a way as to bring the temperature to 65°C in 55 minutes. At the end of this time, cooling is started to bring the temperature to 40°C. The product is then dried in a tray drier operating at 105°C, and is then ground in a hammer mill. It is finally pigmented with titanium dioxide (2% by weight) in a ball mill and granulated by sintering.

The following characteristics are found:

Characteristics of the resin pressed out from the mixture by means of a filler press after discharge from the Werner mixer and before drying:

| | |
|---|---|
| Density at 25°C (g/ml) | 1.280 |
| Viscosity at 25°C in no. 2 Ford cup (sec) | 127 |

-continued

| | |
|---|---|
| pH of the resin | 7.5 |
| pH of the mixture | 7.6 |

Moulding characteristics of the composition obtained after pigmenting in the ball mill:

| | |
|---|---|
| Apparent density (g/ml) | 0.45 |
| Creep | 8 |
| Fluidity | 3 |
| Curing time | 50 |

The determinations were carried out as follows:

Creep: 50 g or the composition are placed at the center of a mould in the form of a disc having a diameter of 20 cm with 6 concentric circles engraved therein. A pressure of 40,000 kg is applied for a time of 60 seconds, the operation being carried out at 150° to 155°C. The closing speed of the press is 0.3 cm/sec. The flow of the material in question is expressed as the number of circles imprinted on the disc, excluding the first which is taken as a value of zero.

Fluidity: The composition is introduced into a mould in the form of a beaker, type UNI 4272, at a preset temperature of 150° to 155°C and a load of 5800 kg is applied by means of a hydraulic press. At the moment when the pointer of the manometer connected to the press indicates an increase in pressure, the stop clock is started. When the descent of the upper plate of the press ceases, the stop clock is stopped. The time that has elapsed, in seconds, give the fluidity.

Curing time: The composition is introduced into a mould in the form of a beaker, type UNI 4272, and subjected to a load of 5000 kg and to the preset temperature of 150° to 155°C. The time, in seconds, that elapses between the closure of the mould and the formation of the beaker free from surface defects (bubbles) is the curing time.

Characteristics of the composition after granulation:

| | |
|---|---|
| Apparent density | 0.60 |
| Creep | 7.75 |
| Fluidity | 4 |
| Curing time | 50 |

Grain size distribution:

| | |
|---|---|
| Residue on the 1250 micron screen (UNI 4274) | 0% |
| 500 micron screen | 38% |
| 250 micron screen | 29% |
| 100 micron screen | 13% |
| <100 micron | 20% |

Characteristics of moulded products:

| | |
|---|---|
| Bending strength kg/cm² (UNI 4274) | 860 |
| Impact strength kg.cm/cm² (UNI 4276) | 7.2 |
| Notch impact strength kg.cm/cm² (UNI 4276) | 1.63 |
| Martens temperature (UNI 4269) | 108 |

EXAMPLE 5

1200 parts by weight of the resin described in Example 1 and 50 parts by weight of cellulose are charged into a disintegrator and treated at ambient temperature for 3 hours. In this way one obtains a slurry, which is continuously pumped at a rate of 125 parts by weight per hour into a thickening screw connected to a filter press. A total of 102 parts by weight per hour of excess resin is obtained from the screw and the press. In this way one obtains a mixture at a rate of 23 parts by weight per hour, to which hexamine (0.35 parts by weight), stearin (0.2 parts by weight) and zinc sulphite (0.2 parts by weight) are added per hour.

The mixture obtained in this way is homogenized at 65°C in a continuous grinder and then discharged into a mixer. The product is then dried in a drier operating at 105°C, ground in a hammer mill, pigmented with 2% by weight of titanium dioxide in a ball mill, and finally granulated by sintering.

The following determinations were carried out:

Characteristics of the resin recovered from the screw and from the press:

| | |
|---|---|
| Density at 25°C | 1.260 |
| Viscosity in no. 2 Ford cup at 25°C | 84 |
| pH | 7.6 |

Characteristics of the resin pressed out from the mixture before drying:

| | |
|---|---|
| Density at 25°C | 1.283 |
| Viscosity in no. 2 Ford cup at 25°C | 130 |
| pH of resin | 8.2 |
| pH of mixture | 7.3 |

Moulding characteristics of the composition after pigmenting in the ball mill:

| | |
|---|---|
| Apparent density | 0.47 |
| Creep | 8.25 |
| Fluidity | 2 |
| Curing time | 55 |

Moulding characteristics of the composition after granulation:

| | |
|---|---|
| Apparent density | 0.59 |
| Creep | 7.75 |
| Fluidity | 4 |
| Curing time | 55 |

Grain size distribution:

| | |
|---|---|
| Residue on the 1250 micron screen | 0% |
| 500 micron screen | 36% |
| 250 micron screen | 27% |
| 100 micron screen | 17% |
| <100 micron | 20% |

Characteristics of the moulded products:

| | |
|---|---|
| Bending strength | 994 |
| Impact strength | 8.12 |
| Notch impact strength | 1.75 |
| Martens temperature | 114 |

EXAMPLE 6

The resin of Example 2 (1200 parts by weight) and cellulose (50 parts by weight) are charged into a disintegrator and treated at ambient temperature for 3 hours. The slurry obtained in this way is continuously pumped into thickening screws and then into a filter press. 101 parts by weight of resin are recovered per hour in this way. The mixture obtained at a rate of 24 parts by weight per hour is treated as described in Example 5.

The following determinations were carried out:

Moulding characteristics of the composition after pigmenting in the ball mill:

| | |
|---|---|
| Apparent density | 0.50 |
| Creep | 8.50 |
| Fluidity | 2 |
| Curing time | 50 |

Moulding characteristics of the composition after granulation:

| | |
|---|---|
| Apparent density | 0.61 |
| Creep | 8 |
| Fluidity | 2 |
| Curing time | 50 |

Grain size distribution:

| | |
|---|---|
| Residue on the 1250 micron screen | 0% |
| 500 micron screen | 40% |
| 250 micron screen | 34% |
| 100 micron screen | 10% |
| <100 micron | 16% |

Characteristics of the moulded products:

| | |
|---|---|
| Bending strength | 1034 |
| Impact strength | 8.43 |
| Notch impact strength | 1.80 |
| Martens temperature | 110 |

EXAMPLE 7

The resin of Example 3 (780 parts by weight) and cellulose (50 parts by weight) are charged into a disintegrator. The mixture is treated at ambient temperature for 3 hours, and the slurry obtained in this way is continuously pumped into thickening screws and then into a filter press. 57 parts by weight of resin are recovered per hour in this manner. The mixture obtained at a rate of 26 parts by weight per hour is treated as described in Example 5.

The following determinations were carried out:

Moulding characteristics of the composition after pigmenting in the ball mill:

| | |
|---|---|
| Apparent density | 0.47 |
| Creep | 8 |
| Fluidity | 5 |
| Curing time | 55 |

Moulding characteristics of the composition after granulation:

| | |
|---|---|
| Apparent density | 0.62 |
| Creep | 8 |
| Fluidity | 4 |
| Curing time | 50 |

Grain size distribution:

| | |
|---|---|
| Residue on the 1250 micron screen | 0% |
| 500 micron screen | 29% |
| 250 micron screen | 33% |
| 100 micron screen | 14% |
| <100 micron | 22% |

Characteristics of the moulded products:

| | |
|---|---|
| Bending strength | 1014 |
| Impact strength | 8.24 |
| Notch impact strength | 1.85 |
| Martens temperature | 118 |

What we claim is:

1. A continuous process for the production of aminoplast moulding compositions, which comprises
   continuously impregnating cellulose material with a syrup of an aminoplast resin, values of about 4:1 to about 50:1 being maintained for weight ratio between said syrup and the said cellulose material;
   continuously eliminating the excess of resin to obtain a quantity of cellulose material of from about 15 to about 50 parts by weight per 100 parts by weight of resin in the impregnated material;
   continuously homogenizing said impregnated material with the appropriate additives, and then subjecting the resulting mixture to drying and granulation.

2. The process according to claim 1, wherein a weight ratio of from about 20:1 to about 30:1 is maintained between the aminoplast resin syrup and the cellulose material in the impregnation step.

3. The process according to claim 1, wherein the continuous impregnation step is conducted at a temperature of from about 25° to about 70°C.

4. Process according to claim 1, wherein the continuous impregnation step requires from about 1 to about 24 hours.

5. The process according to claim 1, wherein the aminoplast resin syrups have a solids content of from about 60 to about 75% by weight.

6. The process according to claim 1, wherein the drying is carried out at temperatures of from 80° to 120°C and for a time of from 15 to 80 minutes.

* * * * *